United States Patent
Geisberger et al.

(10) Patent No.: US 12,274,963 B2
(45) Date of Patent: Apr. 15, 2025

(54) FILTER MEDIUM FOR ENGINE AIR FILTERS

(71) Applicant: NEENAH GESSNER GMBH, Bruckmuehl (DE)

(72) Inventors: Georg Geisberger, Bad Aibling (DE); Andreas Demmel, Feldkirchen-Westerham (DE)

(73) Assignee: NEENAH GESSNER GMBH (DE)

( * ) Notice: Subject to any disclaimer, the term of this patent is extended or adjusted under 35 U.S.C. 154(b) by 640 days.

(21) Appl. No.: 17/421,067

(22) PCT Filed: Jan. 10, 2020

(86) PCT No.: PCT/EP2020/050562
§ 371 (c)(1),
(2) Date: Jul. 7, 2021

(87) PCT Pub. No.: WO2020/144342
PCT Pub. Date: Jul. 16, 2020

(65) Prior Publication Data
US 2022/0096980 A1   Mar. 31, 2022

(30) Foreign Application Priority Data

Jan. 10, 2019   (DE) .................. 10 2019 100 468.3

(51) Int. Cl.
*B01D 39/16*   (2006.01)
*B01D 39/18*   (2006.01)

(52) U.S. Cl.
CPC .... B01D 39/1623 (2013.01); *B01D 2239/065* (2013.01); *B01D 2239/10* (2013.01)

(58) Field of Classification Search
CPC .......... B01D 35/02441; B01D 39/1623; B01D 39/163; B01D 39/18; B01D 2239/065; B01D 2239/10; B01D 2239/0216; B01D 2239/0453; B01D 2239/0622; B01D 2239/0627; B01D 2239/0654; B01D 2239/1233
USPC ..................... 55/385.3, 486, 527; 123/198 E
See application file for complete search history.

(56) References Cited

U.S. PATENT DOCUMENTS

| | | | | |
|---|---|---|---|---|
| 2005/0193696 A1* | 9/2005 | Muller | ................. | B01D 46/543 55/486 |
| 2010/0083838 A1* | 4/2010 | Togashi | ............. | B01D 39/1623 96/10 |
| 2011/0064928 A1* | 3/2011 | Bonneh | ................ | D01D 5/0084 428/212 |
| 2014/0197095 A1 | 7/2014 | Demmel et al. | | |
| 2014/0366732 A1* | 12/2014 | Gao | ..................... | B01D 39/163 55/486 |
| 2015/0013285 A1* | 1/2015 | Disson | ................... | B01D 46/62 55/486 |
| 2015/0328565 A1* | 11/2015 | Swaminathan | .... | B01D 39/1623 210/489 |
| 2017/0087496 A1 | 3/2017 | Hettkamp et al. | | |
| 2019/0314746 A1* | 10/2019 | Leung | ................. | D01D 5/0076 |

FOREIGN PATENT DOCUMENTS

| | | |
|---|---|---|
| CA | 2 940 956 | 9/2015 |
| CA | 2 991 197 | 1/2017 |
| CA | 3 089 207 | 8/2019 |
| CA | 3 089 266 | 8/2019 |
| CA | 3 090 608 | 8/2019 |
| CA | 3 102 518 | 1/2020 |
| CA | 3 151 645 | 4/2021 |
| CA | 3 164 624 | 6/2021 |
| CN | 103874533 | 6/2014 |
| CN | 105209147 | 12/2015 |
| CN | 106999817 | 8/2017 |
| CN | 107019957 | 8/2017 |
| DE | 44 43 158 | 6/1996 |
| EP | 1894499 A2 * | 3/2008 |
| EP | 1932575 | 6/2008 |
| EP | 2747869 | 7/2014 |
| EP | 2821119 A1 * | 7/2015 |
| JP | 2007-125546 | 5/2007 |
| WO | 2013/025445 | 2/2013 |
| WO | 2013/029697 | 3/2013 |
| WO | 2014/149750 | 9/2014 |
| WO | 2015/125942 | 8/2015 |
| WO | 2016/066825 | 5/2016 |

OTHER PUBLICATIONS

Machine-generated English translation of DE4443158 A1, published Jun. 1996.*
Machine-generated English translation of EP 1894499 A2, published Mar. 2008.*
International Search Report issued Feb. 26, 2020 in PCT/EP2020/050562 with English translation, 5 pages.
Written Opinion issued Feb. 26, 2020 in PCT/EP2020/050562 with English translation, 8 pages.
Japanese Office Action dated Jul. 18, 2023, in Japanese Application No. 2021-540337, with English translation, 6 pages.
International Preliminary Report on Patentability issued Jun. 16, 2021 in PCT/EP2020/050562 with English translation, 12 pages.
Canadian Office Action dated Jan. 10, 2024, received for Canadian Patent Application No. 3,126, 186, 4 pages.

* cited by examiner

*Primary Examiner* — Frank M Lawrence, Jr.
(74) *Attorney, Agent, or Firm* — Farber LLC

(57) ABSTRACT

A filter medium for engine air filters contains a support layer and a meltblown layer containing polyester fibres. The filter medium is electrically charged.

18 Claims, No Drawings

FILTER MEDIUM FOR ENGINE AIR FILTERS

CROSS-REFERENCE TO RELATED APPLICATIONS

This application is the National Stage entry under § 371 of International Application No. PCT/EP2020/050562, filed on Jan. 10, 2020, and which claims the benefit of priority to German Application No. 10 2019 100 468.3, filed on Jan. 10, 2019. The content of each of these applications is hereby incorporated by reference in its entirety.

BACKGROUND OF THE INVENTION

Field of the Invention

The present invention relates to a filter medium for engine air filters, the filter medium comprising a carrier layer and a meltblown layer, and a filter element comprising such a is filter medium.

Description of Related Art

The important quality criteria for air filter media include is high filtration efficiency, i.e. the separation of large and small particles, as well as a sufficiently high dust holding capacity. With regard to engine air filter media, it should be noted that the engine sucks in between 200 $m^3$ and 500 $m^3$ of air per hour at full load, depending on the cubic capacity. This air is loaded with dirt and dust particles. If the filter element does not allow enough air to pass through, the engine cannot develop its full capacity.

Engine air filter elements are responsible for supplying the engine with purified air necessary for a proper combustion. process. The engine air filter media also has the following functions with regard to air management in the vehicle: Filtration of the engine intake air; improvement of airflow for optimal combustion and engine acoustics, such as dampening intake noise; protection of downstream engine parts, for example a turbocharger, from particle bombardment.

To increase filtration efficiency, nanofibre layers are used (i.e. with fibre diameters smaller than 1.5 μm), but these require complicated manufacturing processes and are therefore expensive. Another disadvantage is the low mechanical stability of the nanofibre layer.

In addition, the engine air filters must be replaced at the intervals specified by the vehicle manufacturer. This is done as part of the inspection work. If there is a high dust content in the air (or a certain mileage), it is advisable to replace the filter earlier. Therefore, ideally the filter medium (or filter) should be as inexpensive as possible.

SUMMARY OF THE INVENTION

The invention is therefore based on the object of creating a filter medium and a filter element that is particularly is suitable for air filters of engines, has very good efficiency and dust holding capacity, as well as being easy to produce using standard manufacturing processes and correspondingly inexpensive to produce.

DETAILED DESCRIPTION OF THE INVENTION

The present invention relates to a filter medium for engine air filters comprising a carrier layer and a meltblown layer containing polyester fibres, wherein the filter medium is electrically charged.

The filter medium is particularly suitable for engine air filters. Until now, engine air filter media have not been charged because rapid discharge occurs when dust levels are so high and thus no difference in filtration efficiency was apparent compared to a non-charged media. Surprisingly, it was found that the charged filter media of the present invention has better efficiency and dust holding capacity compared to non-charged media. Therefore, the meltblown layer can be manufactured with larger fibre diameters. This allows for cheaper manufacturing and higher efficiency and dust holding capacity of the filter media with the same pressure drop.

Preferably, the polyester fibres contain polybutylene terephthalate or consist of polybutylene terephthalate fibres.

The average diameter of these meltblown fibres is in particular 2 to 8 μm, preferably 2 to 5 μm and particularly preferably 3 to 4 μm. The average diameter is measured using the method described here.

The meltblown layer according to the invention has a thickness of in particular 0.05 to 0.90 mm at 0.005 bar test plate pressure, preferably 0.10 to 0.80 rem and particularly preferably 0.15 to 0.70 mm.

The basis weight of the meltblown layer is in particular 5 to 90 $g/m^2$, preferably 10-60 $g/m^2$, particularly preferably 15-25 g /$m^2$.

The air permeability of the meltblown layer according to the invention is in particular 50-3000 l/$m^2$s, preferably 300 to 2000 l/$m^2$s and particularly preferably 800 to 1300 l/$m^2$s.

The meltblown process known in the art is used to produce the meltblown nonwoven according to the invention. Suitable polymers (in particular polyesters) are, for example, polyethylene terephthalate or polybutylene terephthalate, Preferably, the meltblown layer comprises polybutylene terephthalate fibres. Particularly preferably, the meltblown layer consists of polybutylene terephthalate fibres. Depending on the requirements, additives, such as hydrophilizing agents, hydrophobizing agents, crystallization accelerators or colours, can be added to the polymers. The meltblown layer can be electrically charged during production or charged together with the carrier layer. All known methods such as corona charging can be used as charging methods.

To increase the charge stability, additives known in the art can be mixed in, such as bis-stearoyl-ethylenediamide.

The carrier layer can be a wet-laid layer or a dry-laid layer.

Wet-laid layer or paper layer in the sense of the invention are all layer that can be produced with the wet-laid processes known in the art for the production of filter papers. The wet-laid layer may contain natural fibres, synthetic fibres or mixtures thereof. Examples of natural fibres include cellulose, cotton, wool and hemp, and the cellulose material used may include wood-free and/or wood-containing cellulose from coniferous and/or deciduous trees, regenerated cellulose and fibrillated cellulose.

Suitable synthetic fibres include polyester fibres (e.g. polyethylene terephthalate, polybutylene terephthalate and PLA fibres), polyolefin fibres, polyamide fibres, polyacrylonitrile fibres and multi-component fibres with different melting points of the individual components.

The synthetic fibres in the wet-laid layer have an average so fibre diameter of in particular 3 μm (0.1 dtex) to 30 μm (10 dtex), preferably from 7 to 20 μm, and the cut length is preferably 3 mm-20 mm, particularly preferably 4 mm-12 mm.

The carrier layer may comprise 100 wt % natural fibres (based on the total amount of fibres). The carrier layer may comprise 30-45 wt % synthetic fibres and 70-55 wt % natural fibres or may comprise 100 wt % synthetic fibres. Preferably, the carrier layer comprises 100 wt: natural fibres.

The wet-laid carrier layer has a thickness at 0.005 bar test plate pressure of in particular 0.1 mm to 1.2 mm, preferably 0.2 mm to 0.9 mm, particularly preferably 0.3 mm to 0.8 mm.

The dry-laid carrier layer is a layer that can be produced using the dry-laid processes known in the art for producing nonwoven layers. Preferably, the nonwoven layer is a spunbonded or carded nonwoven comprising only synthetic fibres. Preferably, the dry-laid carrier layer consists of a spunbonded layer. The dry-laid carrier layer preferably has a thickness of 1 mm to 3.0 mm at 0.005 bar test plate pressure. Particular preferably, the thickness of the dry-laid carrier layer is 1.2 mm to 2.5 ram and especially 1.3 mm to 2.1 mm.

The dry-laid carrier layer comprises mono- and/or bi-component synthetic fibres. Preferably, the dry-laid carrier layer comprises (or consists of) monocomponent polyester fibres and more preferably polyethylene terephthalate fibres. Suitable synthetic fibres include, for example, polyester fibres (e.g. polyethylene terephthalate, polybutylene terephthalate and PEA fibres), polyolefin fibres, polyimide fibres, polyacrylonitrile fibres and multicomponent fibres with different melting points of the individual components.

Bicomponent fibres consist of a thermoplastic material with at least one fibre portion with a higher melting point and a second fibre portion with a lower melting point. The physical configuration of these fibres is known to the skilled person and typically consists of a side-by-side or sheath-core structure.

The bicomponent fibres can be made from a variety of thermoplastic materials including polyolefins (such as polyethylenes and polypropylenes), polyesters (such as polyethylene terephthalate (PET), polybutylene terephthalate (PET), polyamides including nylon 6, nylon 6,6, nylon 6,12, etc.). Preferably, the bicomponent fibres are made of polyesters. Particularly preferably, the bicomponent fibres are made of PET/coPET.

The mono- and bicomponent fibres of the dry-laid carrier layer is have in particular an average diameter of 10 to 50 µm, preferably 12 to 40 µm and particularly preferably 14 to 35 µm.

The carrier layer can be impregnated, whereby the type of impregnating agent is selected by the skilled person depending on the intended use of the filter material according to the invention. The proportion of the dry impregnating agent in the total weight of the paper typically 0.5 wt %-50 wt %, preferably 5 wt %-40 wt %. The substances known for filter papers are used as impregnating agents, such as phenolic resins or epoxy resins from alcoholic solutions, but also aqueous dispersions of, for example, acrylates, phenolic resins, polyvinyl chloride, polyvinyl acetates. Another possible class of impregnating agents are aqueous solutions of, for example, so polyvinyl alcohol, melamine resin, urea resin. To improve the wettability and thus increase the flow rate, the impregnation can be made hydrophilic or oleophilic by suitable additives such as surface-active substances or fluorocarbon resins.

The basis weight of the carrier layer (i.e. wet-laid or dry-laid layer) is in particular 50-350 g/m$^2$, preferably 70-250 g/m$^2$ and particularly preferably 80-200 f/m$^2$.

The carrier layer (i.e. wet-laid or dry-laid layer) has an air permeability, of in particular 50-4000 l/m$^2$s, preferably 100-3000 l/m$^2$s and particularly preferably 200 to 2800 l/m$^2$s.

The filter medium can either consist only of the combination of the carrier layer and meltblown layer described here, or it can include one or more other layers.

The meltblown layer can be bonded to the carrier layer to produce the filter media. Any process known to the skilled person can be used for this purpose, such as needling processes, water needling processes, thermal processes (i.e. calender bonding and ultrasonic bonding) and chemical processes (i.e. bonding by means of adhesives). Preferably, the meltblown layer is bonded to the carrier layer using point calenders or adhesives. The application rate of the adhesive is 2-10 g/m$^2$, preferably 4-8 g/m$^2$.

The filter medium according to the invention has a basis weight of preferably 55 q/m$^2$-440 g/m$^2$, preferably from 80 to 300 g/m$^2$ and particularly preferably from 90 to 200 g/m$^2$. Preferably, the air permeability of the filter medium is 50 -1200 l/m$^2$ s, preferably 100 to 1000 l/m$^2$s and particularly preferably 200 to 900 l/m$^2$s.

Preferably, the thickness of the filter medium at 0.005 bar test plate pressure is 0.4 to 2.5 mm, particularly preferably 0.45 to 2 mm and even more preferably 0.45 to 1 nm.

The maximum pore diameter (or also the largest pore size) of the filter medium according to the invention is in particular 30-120 µm, preferably 35-110 µm. The diameters of many pores of the filter medium according to the invention are in particular 20-80 µm and preferably 25-65 µm.

The filter medium has an H-value of in particular from 1.00 to 2.50, preferably from 1.00 to 2.00, and particularly preferably from 1.00 to 1.80. The H-value is calculated from:

$$H\text{-value} = \text{largest pore diameter}/\text{diameter of many pores}$$

When the H-value is in the range described above, a very good homogeneity is shown, so that the filter medium can guarantee very high efficiency and dust holding capacity for a long time.

The filter medium according to the invention has an efficiency of in particular at least 99.00%, preferably at least 99.70 and particularly preferably at least 99.90%. The efficiency given here corresponds to the total efficiency after a pressure increase to 2000 Pa. This is to be distinguished from an initial efficiency.

The filter medium according to the invention has a dust holding capacity of in particular 70 to 350 g/m$^2$, preferably 100 to 300 g/m$^2$ and particularly preferably 125 to 300 g/m$^2$.

Since the filter medium according to the invention has excellent breaking strength, it only needs to be renewed after longer time intervals.

Filter media that also contain natural fibres have a breaking strength in the machine direction (MD) of in particular 60-200 N, preferably 70-180 N and particularly preferably 75-100 N. Filter media containing only synthetic fibres (and no natural fibres) have a breaking strength in the machine direct on (MD) of 250-600 N, preferably in particular 350-600 N and particularly preferably 400-600 N.

The inflow direction is preferably from the side of the carrier layer, but can also be from the side of the meltblown layer.

The present invention also relates to a filter element comprising the filter medium. The filter element may additionally comprise another filter medium which differs from the filter medium according to the invention, i.e. has other properties.

A particularly advantageous field of application for the filter medium according to the invention is engine air Filters.

Test Methods

Basis weight according to DIN EN ISO 536:2012-11.

Thickness according to DIN EN ISO 9073-2 (1997-02) at 0.5 kPa test plate pressure with 2500 mm² test area (56.42 mm diameter).

Air permeability according to DIN EN ISO 9237 (1995-12) at 200 Pa pressure difference.

Pore size according to DIN ISO 4003 (1990-10), based on flat sample measurement. Reagents: Ethanol denatured (=Ethanol 100 L with 1 L MEK (methyl ethyl ketone) as denaturant). The nonwoven is clamped airtight over a cavity provided with an air supply line and a connection to a manometer (U-tube with mm display).

Denatured ethanol is added over the edge of the upper sample holder (do not spray directly onto the sample/approx. 4 mm height) and at the same time a slight overpressure is created. The overpressure is slowly increased (approx. 5 mm WS/sec) until the first air bubble becomes visible.

This necessary pressure is read on the manometer (mm WS), and with the help of the surface tension of the ethanol (23° C.) the largest pore diameter, "largest pore", is calculated. If the overpressure is increased to such an extent that air passes through the entire test area (10 cm²) (approximately even distribution of air bubbles, but no foaming), the value of the many pores is obtained. For this purpose, the overpressure of the "many pores" is determined again and the corresponding pore diameter is calculated.

Breaking Strength

For total filter medium (carrier+meltblown; where the filter medium comprises natural fibres) following DIN EN ISO 1924-2 (2009-05) (measuring strip 100 mm long, 15 mm wide; peel-off speed 15 mm/min).

For total filter medium (carrier+meltblown; where the filter medium does not include natural fibres) following DIN EN ISO 29073 part 3 (1992-08) (measuring strip 100 mm long, 50 mm wide; peel-off speed 100 mm/min).

Efficiency and Dust Holding Capacity

The stated efficiency values were measured based on flat sample measurement according to ISO 5011:2014. Test conditions:

Test dust ISO 12103-A2 (ISO Fine)
Mass concentration: 1 g/m³
Incoming flow velocity 11.1 cm/s
Filter area: 100 cm²

The total efficiency and dust holding capacity are measured when a final pressure of 2000 Pa is reached.

Fibre Diameter

Measuring principle: Using a scanning electron microscope, images are taken at a defined magnification. These are measured using automatic software. Measuring points that capture crossing points of fibres and thus do not represent the fibre diameter are removed manually. Fibre bundles are generally evaluated as one fibre.

Devices:
Scanning electron microscope Phenom Fei with associated software Fibermetric V2.1

Conduct of the Examination:
Sampling: nonwoven fabric at 5 points across web width (at 1.8 m)
Recordings:
a. Sputter the sample;
b. Random recording on the basis of optical image, the spot thus found is recorded with 1000-fold magnification by means of SEM.
c. Fibre diameter determination via "one click" method, each fibre must be recorded once;
d. Average value and fibre diameter distribution is evaluated by the data obtained from Fibermetric using Excel. Thus, the average fibre diameter is recorded at at least five points per nonwoven. The five average values are combined into one average value. This value is called the average fibre diameter of the nonwoven. At least 500 fibres are evaluated.

EXAMPLES

Example 1

A. 20 g/m² PET (polybutylene terephthalate) meltblown with a thickness of 0.22 mm, an air permeability of 650 l/m²s and an average fibre diameter of 3.5 µm was bonded to a 135 g/m² wet-laid paper layer with a thickness of 0.68 mm by means of point calendars and loaded with corona charge. The paper layer used here is made of cellulose and was previously impregnated with resin.

The filter material thus obtained has a thickness of 0.75 mm, an air permeability of 365 l/m²s and a basis weight of 155 g/m². The largest pore diameter of the filter medium is 39 µm. and the diameter of many pores is 27 µm.

Example 2

A 60 g/m² PBT meltblown with a thickness of 0.66 mm, an air permeability of 1200 l/m²s and an average fibre diameter of 9 µm was bonded to a 130 g/m² PET/CoPET spunbond nonwoven with a thickness of 1.47 mm by point calendaring and loaded with so corona charge.

The filter material obtained has a thickness of 2.00 mm, an air permeability of 900 l/m²s and a basis weight of 190 g/m².

The largest pore diameter of the filter medium is 100 µm and the diameter of many pores is 58 µm.

Comparative Example 1

Corresponds to the same filter medium of example 1, but was not loaded with corona charge.

Comparative Example 2

Corresponds to the same filter medium of example 2, but was not loaded with corona charge.

Some advantages of the filter medium according to the invention are listed in Table 1.

TABLE 1

| | Example 1 | Comparative example 1 | Example 2 | Comparative example 2 |
|---|---|---|---|---|
| Efficiency (%) | 99.98 | 99.84 | 99.90 | 99.29 |
| Dust holding capacity (g/m²) | 127 | 123 | 272 | 220 |

The invention claimed is:
1. A filter medium for use in engine air filters comprising:
a carrier layer;
a meltblown layer in contact with the carrier layer, the meltblown layer comprising fibers having an average diameter of about 3.5 µm to about 8 µm; and wherein the filter medium is electrically charged and has a maximum pore diameter of about 30 µm to about 120 µm.

2. The filter medium of claim 1, wherein the filter medium has an H-value of about 1.00 to about 2.50.

3. The filter medium of claim 1, wherein the meltblown layer has a thickness of about 0.05 mm to about 0.9 mm.

4. The filter medium of claim 1, wherein the carrier layer is a wet-laid layer.

5. The filter medium of claim 1, wherein the carrier layer comprises natural fibers.

6. The filter medium of claim 1, wherein the carrier layer consists of natural fibers.

7. The filter medium of claim 5, wherein the natural fibers are selected from the group consisting of cellulose, cotton, wool, hemp, regenerated cellulose, fibrillated cellulose and combinations thereof.

8. The filter medium of claim 4, wherein the fibers in the wet-laid layer have an average diameter of about 3 μm to about 30 μm.

9. The filter medium of 1, wherein the carrier layer comprises synthetic fibers having an average diameter of about 10 μm to about 50 μm.

10. The filter medium of claim 1, wherein the meltblown layer comprises polyester fibers.

11. A filter for use in engine air filters comprising:
a carrier layer;
a meltblown layer in contact with the carrier layer, the meltblown layer comprising fibers having an average diameter of about 3.5 μm to about 8μm; and
wherein the filter medium is electrically charged and has a maximum pore diameter of about 30 μm to about 120 μm.

12. The filter of claim 11, wherein the carrier layer comprises natural fibers selected from the group consisting of cellulose, cotton, wool, hemp, regenerated cellulose, fibrillated cellulose and combinations thereof.

13. The filter of claim 11, wherein the carrier layer consists of natural fibers.

14. The filter medium of claim 11, wherein the fibers in the carrier layer have an average diameter of about 3 μm to about 30 μm.

15. The filter of 11, wherein the carrier layer comprises synthetic fibers having an average diameter of about 10 μm to about 50 μm.

16. The filter of claim 11, wherein the meltblown layer comprises fibers having an average diameter of about 3 μm to about 4 μm.

17. The filter of claim 11, wherein the filter medium has an H-value of about 1.00 to about 2.50.

18. The filter of claim 11, wherein the meltblown layer has a thickness of about 0.05 m to about 0.9 mm.

* * * * *